(12) United States Patent
Oh et al.

(10) Patent No.: US 6,515,845 B1
(45) Date of Patent: Feb. 4, 2003

(54) METHOD FOR PREPARING NANOPOROUS CARBON MATERIALS AND ELECTRIC DOUBLE-LAYER CAPACITORS USING THEM

(75) Inventors: Seung-Mo Oh, 603-201, Mokryun Dosan Apt., 1054-6, Pumgye 5-Dong, Tongan-Gu, Ahanyang-City, Kyung ki-Do (KR); Taeg-Hwan Hyeon, Ka-Dong 204, kyosu Apt, 244-2, Bongchoun 7-Dong, Kwanack-Gu, Seoul (KR); Sang-Jin Han, Seoul (KR)

(73) Assignees: Fincell Co., Ltd., Sungnam (KR); Viable Korea Co., Ltd., Ansung (KR); Seung-Mo Oh, Ahanyang (KR); Taeg-Hwan Hyeon, Seoul (KR)

( * ) Notice: Subject to any disclaimer, the term of this patent is extended or adjusted under 35 U.S.C. 154(b) by 0 days.

(21) Appl. No.: 09/658,199

(22) Filed: Sep. 8, 2000

(30) Foreign Application Priority Data

Feb. 22, 2000 (KR) .......................................... 2000-8469

(51) Int. Cl.$^7$ ................................................. H01G 9/00
(52) U.S. Cl. ........................ 361/502; 361/512; 361/523; 361/518; 438/402; 438/408
(58) Field of Search ................ 423/445, 447.1, 423/447.2, 447.9, 449, 461; 521/91, 61; 361/502, 512, 523, 528, 518; 438/402, 408

(56) References Cited

U.S. PATENT DOCUMENTS

| | | | |
|---|---|---|---|
| 4,756,898 A | * | 7/1988 | Hopper et al. .............. 423/449 |
| 4,933,372 A | * | 6/1990 | Feibush et al. ................ 521/91 |
| 5,009,823 A | * | 4/1991 | Kromrey |
| 5,047,438 A | * | 9/1991 | Feibush et al. |
| 5,182,016 A | * | 1/1993 | Funkenbusch et al. |
| 5,221,497 A | | 6/1993 | Watanabe ................ 252/313.2 |
| 5,281,413 A | * | 1/1994 | Abrutyn et al. ................ 424/68 |
| 5,851,504 A | * | 12/1998 | Barker et al. ............. 423/447.2 |
| 5,902,562 A | * | 5/1999 | Lagasse et al. ............. 423/445 |

OTHER PUBLICATIONS

Zakhidov, A., et al., "Carbon Structures with Three–Dimensional Periodicity at Optical Wavelengths" *Science*, vol. 252, Oct. 30, 1998, pp. 897–901.

Ryoo, R., et al., "Synthesis of Highly Ordered Carbon Molecular Sieves via Template–Mediated Structural Transformation" *The Journal of Physical Chemistry B*, Aug. 27, 1999, pp. 7743–7746.

Rodriguez–Mirasol, J., et al., "Structural and Textural Properties of Pyrolytic Carbon Formed within a Microporous Zeolite Template" *Chem. Mater* Jan. 30, 1998, pp 550–558.

* cited by examiner

*Primary Examiner*—Dean A. Reichard
*Assistant Examiner*—Nguyen Ha
(74) *Attorney, Agent, or Firm*—Ladas & Parry (57) ABSTRACT

Disclosed herein is the fabrication method of producing nanoporous carbon materials with pore sizes ranging from 2 nanometer to 20 nanometer which can be used as electrode materials for a supercapacitor and an electric double layer capacitors being a kind of supercapacitor. The invention also relates to electric double layer capacitors utilizing these carbon materials as electrodes. The carbon materials presented in the present invention possess regular pores with dimensions ranging in between 2 nm and 20 mm and exhibit high electrical conductivity. These carbon materials shows low equivalent series resistance (ESR) and thus exhibits high charge storage capacity at high charging/discharging current density.

12 Claims, 9 Drawing Sheets

METHOD FOR PREPARING NANOPOROUS CARBON MATERIALS AND ELECTRIC DOUBLE-LAYER CAPACITORS USING THEM

BACKGROUND OF THE INVENTION

The present invention relates to the fabrication method of preparing nanoporous carbon materials with pore sizes ranging from 2 nanometer to 20 nanometer which can be used as electrode materials for supercapacitors and electric double layer capacitors being a kind of supercapacitor. The present invention also relates to electric double layer capacitors utilizing these carbon materials as electrodes Recently, the development of supercapacitors is intensively pursued for the high pulse-power energy source and load-leveling devices for secondary batteries and fuel cells, which are the power sources for the next-generation mobile telecommunication system, IMT-2000 and electric vehicle.

In general, supercapcitors can be classified into electric double layer capacitor and pseudocapacitor. The former utilizes electric double layer formed in the interface of electrode surface and electrolyte. The latter utilizes pseudocapacitance developed inside the electrode from electrochemical reactions. The application of pseudocapacitors is limited because expensive $RuO_2$ or $IrO_2$ is utilized as electrode material.

In this connection, when describing more details on electric double layer capacitors, in the electric double layers formed in the interface between electrode and electrolyte, ions are accumulated in the electrolyte phase, and electric charges, which can be released during discharge cycle, are stored on the electrode. Secondary batteries are similar charge storage devices as supercapacitors; however, compared to secondary batteries, supercapacitors can be operated at high current condition and have longer lifetime.

In general, the equivalent circuit for electric double layer capacitor electrodes can be represented as a serial combination of equivalent series resistance (ESR) and double-layer capacitance. The double-layer capacitance is proportional to the surface area of the electrode and the equivalent series resistance is the summation of resistance from electrode, electrolyte bulk solution, and electrolyte in the electrode pores. Capacitance stored in electric double layer capacitors decrease as charging/discharging rate increases and is determined by ESR.

Therefore, the electrode materials for electric double layer capacitors should satisfy the following characteristics: (1) high surface area for high double-layer capacitance, (2) high electrical conductivity for low resistance of electrode, (3) low resistance from the electrolyte in the pores of electrode.

So far, activated carbon powder and activated carbon fiber were utilized as electrode materials for electric double layer capacitors. These activated carbons are produced from the physical or chemical activation of precursors such as wood, peat, charcoal, coal, brown coal, coconut shell, and petroleum coke. However, compared to the requirements for electrode materials for electric double layer capacitors, the following problems exist for the activated carbons.

First, these activated carbons possess irregularly connected pores composed of micropores (below 2 nm), mesopores (2 nm~50 nm) and macropores (over 50 nm), which limit them for the successful application as electrode materials for electric double layer capacitors. The micropores are not so easily wetted by electrolytes, and the surface exposed in micropores may not be utilized for charge storage. Moreover, even in the situation where micropores are wetted by electrolytes, ionic transfer in such small pores are not so facilitated that the high rate capability, which is one of the advantages belonging to electric double layer capacitors, may not be realized. Both charge storage and rate capability is further limited if pores are randomly connected. It is generally accepted that pore sizes bigger than 2 nm is desirable for the electrode materials for the electric double layer capacitors in aqueous electrolyte media, and pore sizes bigger than 5 nm for those in organic electrolyte media.

Second, these activated carbons have low electrical conductivity because micrometer-sized particles are irregularly interconnected resulting from the poor pore connectivity. Conducting additives such as carbon black can be added to activated carbons to increase electric conductivity and to decrease ESR as a result, which, however, will decrease capacitance per weight or volume. On the other hand, electrolyte cannot penetrate into poorly connected isolated pores and charge cannot be stored. In addition, the movement of electrolyte ions will be limited in the poorly connected pores and thus resistance is large.

Accordingly, for achieving high power density for electric double layer capacitors, ESR of the electrode materials must be small and it should have high capacitance as well. For small ESR of the electrode materials, they should possess high electrical conductivity and large pores as mesopores. It is more preferable to have well-connected pores to achieve small ESR.

In this connection, Y. Z. Zhang and coworkers tried to control the pore structure of activated carbons and activated carbon fibers through the treatment with NaOH combined with the activation by $CO_2$ for their application to electrode materials for electric double layer capacitors (Carbon 24th Biennial Conference on Carbon 11–16, p.434 (1999)). However, they could control the pore size through the research, whereas they could not control pore connectivity of the materials.

Meanwhile, Ryong Ryoo and coworkers used cubic MCM-48 mesoporous silica molecular sieve as template for the synthesis of mesoporous carbon materials. They put sucrose into the pores of MCM-48 silica in the presence of acid catalyst and carbonized sucrose by heating at 800~1100° C. under inert atmosphere followed by removing the template material using sodium hydroxide.

This process has some problems because expensive mesoporous silica molecular sieve is used as template and the pore structure of nanoporous carbon produced is inevitably determined by the pore structure of the template and cannot easily controlled.

SUMMARY OF THE INVENTION

The present invention has been made to overcome the above drawbacks. That is, the aim of the present invention is to develop new preparative method to solve all the problems associated with the synthesis of nanoporous carbon materials.

Accordingly, an object of the present invention is to provide the method of preparing nanoporous carbon materials which can be used as electrochemical materials such as electrodes for electric double layer capacitors. More specifically, carbon precursors will be formed in the presence of inorganic template particles to generate template/carbon-precursor composites. These template/carbon-precursor composites will be carbonized, and after the removal of the template, nanoporous carbons will be produced.

The key idea in the process is that the structure of templates will eventually determine the pore structure of the resulting carbon materials. Keeping in mind this idea, we could fabricate nanoporous carbon materials with pore sizes bigger than 2 nm using inorganic templates and further we could also produce nanoporous carbon materials with well-interconnected 2 nm to 20 nm pores, suitable for the electrodes of electric double layer capacitors, which completes the present invention.

Another object of the invention is to provide the method for preparing nanoporous carbon materials with well-interconnected 2 nm to 20 nm pores and high electrical conductivity. By our earnest work, it wad found that the electrode materials made of these nanoporous carbons exhibited excellent charge storage capacity for their applications to electric double layer capacitors at high charging/discharging conditions, which finally completed the present invention. So, the nanoporous carbon materials with well-interconnected 2 nm to 20 nm pores and high electrical conductivity can be applied for the fabrication of electric double layer capacitors with excellent charge storage capacity at high charging/discharging conditions by minimizing equivalent series resistance.

Therefore, a further object of the inventions is to provide electric double layer capacitors comprised with nanoporous carbon materials.

In order to achieve the objects, a method of the present invention for preparing the nanoporous carbon materials comprising:

- a step (a) for synthesizing the inorganic-template/carbon-precursor composites in which the inorganic template particles stabilized with surfactants are dispersed in carbon precursor;
- a step (b) for producing the Inorganic-template/carbon composites from the carbonization of inorganic-template/carbon-precursor composite under inert atmosphere at the temperature of 600 to 1500° C.; and
- a step (c) for removing the inorganic templates in the inorganic-template/carbon composites by treating with base or acid to produce nanoporous carbon materials.

One characteristic of the present invention is that the shape and size of pores of the produced carbons can be controlled by the shape and size of inorganic templates, and thus the proper templates can be selected to generate carbon materials with desired pore size and structures. Any shapes of inorganic templates can be selected, such as spherical, ellipsoidial, hexahedral, linear and etc. For example, when spherical shaped templates were used, the resulting carbons would possess closed pores, and when linear shaped templates were applied, the carbons would possess open pores. As explained previously, inorganic templates with linear or extended shapes are desirable for the synthesis of carbon materials for the electrodes for electric double layer capacitors, because well-connected open pores are need for them.

The size of inorganic templates should be bigger than 1 nm, and particles raging 2 nm to 20 nm are more preferable as template for the carbon synthesis.

Silica, alumina, titania or ceria can be applied as inorganic templates. Among them, silicas are more preferable as templates because they are cheap and can be easily removed by dissolving using weak acid or base.

Commercially available spherical silica templates including Ludox HS-40, Ludox SM-30 and Ludox TM-40 (Dupont) and linear-shaped silica templates such as Snowtex-up (Nissan Chemicals) can be applied.

Silica templates can be also synthesized from the sol-gel reaction (hydrolysis and condensation) of sodium silicate or tetraethoxy orthosilicate using acid or base catalyst. By controlling the sol-gel reaction condition, the shape of the silica template can be easily controlled, which eventually control the pore shape of the produced nanoporous carbons.

DETAILED DESCRIPTION OF THE INVENTION

As explained previously, mesoporous silica molecular sieves such as MCM-48, which Ryong Ryoo used as templates, will not be applied as template in the present invention.

That is because, even though mesoporous carbons with uniform pore sizes can be obtained by using such mesoporous silica templates, the pore structure of the carbon cannot be easily controlled because the pore structure of the mesoporous silica will determine the pore shape of the resulting carbons.

In addition, the mesoporous silica materials is too expensive to be applied as templates for nanoporous carbons. In contrast, inorganic templates applied in the present invention are cheap and do not possess mesopores and can form inorganic template structure in the fabrication process.

In the present invention, inorganic templates are not fixed structures that determine the pore structure of the resulting carbon materials. Instead, the structures of inorganic templates can be controlled easily under various reaction conditions in the step (a) and resulting inorganic template structure play a role of pore-formers. In other word, the size and shape of the inorganic templates match with that of the resulting carbons.

Hence, another feature of present invention is the possibility to control the forms of inorganic template structures which will be removed by acid or base in the step (c) by means of specifying the forming condition in the step (a).

The forms of inorganic templates structure can be determined by the reaction conditions and by the kind and amount of surfactants used as stabilizers. Inorganic particles in sol state can be agglomerated during the fabrication of carbons and therefore the pore size of the resulting carbon can be larger than the primary particle size of the original inorganic template sols. After all, by controlling the agglomeration process of the inorganic template sols, the pore size of the carbon materials can be controlled.

For achieving such objects, the following surfactants can be applied as stabilizers: Cationic surfactants such as alkyltrimethylammonium halides, neutral surfactants such as aleic acid and alkyl amines, and anionic surfactant such as sodium alkyl sulfates and sodium alkyl phosphates. For example, in the case of silica templates whose surface is anionic, silica templates can be stabilized with cationic surfactants such as cetyltrimethylammonium bromide (CTAB), cetyltrimethylammonium chloride (CTAC), tetradecyltrimethylammonium bromide, tetradecyltrimethylammonium chloride, dodecyltrimethylammonium bromide and dodecyltrimethylammonium chloride. Any surfactant can be applied as a stabilizer for inorganic template if it fits the formation of the present invention.

Any carbon precursor can be applied in the process if it can disperse inorganic template well in the medium of inorganic-template/carbon precursor composites and also can be carbonized during the heat treatment process. These carbon precursors include resorcinol-formaldehyde gel (RF-gel), phenol-formaldehyde gel, phenol resin, melamine-formaldehyde gel, furfuryl alcohol, polyacrylonitrile and petroleum pitch.

In the case of using RF-gel as carbon precursor, aqueous solutions containing 20 to 60 weight percent of inorganic template particles stabilized with surfactants specified in the step (a) are prepared, and the resulting aqueous solution is mixed with 30 to 70 weight percent aqueous solution of the mixture of resorcinol and formaldehyde (1:2 to 1:3 molar ratio) to produce mixtures with weight ratio of 1:1 to 1:20 (resorcinol-formaldehyde:inorganic template), followed by polymerizing at 20° C. to 95° C. to produce inorganic template/carbon precursor composites as specified in the step (a). In the case of commercial silica sol as template, resorcinol and formaldehyde can be polymerized without using catalyst, because weak basic property of the silica sol solution readily induces polymerization. In order to accelerate the specified polymerization reaction, catalyst such as sodium carbonate can be also added.

When phenol resin, melamine-formaldehyde gel, polyfurfuryl alcohol, polyacrylonitrile or petroleum pitch is applied as carbon precursor, aqueous solution containing 20 to 60 weight percent of inorganic template particles is mixed with the organic solutions containing 10 to 99 weight percent of carbon precursor to produce inorganic template/carbon precursor composites with weight ratio of 1:1 to 1:20 (carbon precursor:inorganic template) specified in the step (a) of the present invention.

When the said carbon precursor is produced from the polymerization of other monomer, appropriate reported synthetic method can be applied according to the properties of monomer.

By aging for 1 to 10 days after the polymerization reaction specified in the process (A), very little un-reacted monomer can be left. Aforementioned aging means keeping the reaction mixture for specified time at room temperature to 120° C. It is more desirable to wash unreacted monomer with distilled water after the aging.

In the case of using silica as inorganic template, aqueous solution of hydrofluoric acid or sodium hydroxide may be applied as removing solvent, because nanoporous carbon materials are produced by removing inorganic template particles through the treatment with acid or base in the step (c). For example, in the case of using hydrofluoric acid to remove silica template, silica template may be easily removed by stirring silica template particle/carbon composite in 20% to 50% aqueous hydrofluoric acid solution for 30 minutes to 50 hours at room temperature.

Micropores of less than 1 nm formed during the carbonization of carbon precursor facilitate easy movement of hydrofluoric acid or sodium hydroxide, enabling the removal of inorganic template and finally producing nanoporous carbon materials. As consequence, the shape and size of inorganic template particles determines the shape and size of pores in the carbon materials produced.

The detailed procedure for the synthesis of nanoporous carbons for electric double layer capacitors is described as the below.

5 g to 20 g of CTAB (cetyltrimethylammonium bromide) surfactant is added to 100 ml of sol solution of spherical (for example, Ludox SM-30 or HS-40) or extended silica (for example, Snowtex-up), resulting in muddy slurry. The slurry is washed with distilled water under mild vacuum to remove un-adsorbed surfactant. Resorcinol-formaldehyde gel (RF gel) is used as a carbon precursor. A solution of resorcinol, formaldehyde, $Na_2Co_3$ (catalyst) and $H_2O$ (1:1~4: 0.005~0.03: 2~7 molar ratio) with pH 7.3 is added dropwise under mild suction to be infiltrated to the CTAB-stabilized silica particles. The pH of the reaction mixture is adjusted using either 1N NaOH or $HNO_3$ solution. The resulting yellow mixture of silica and RF gel is aged at 20 to 95 for 1 to 10 days to obtain a red RF gel-silica composite. The composite is carbonized at 600 to 1500 for 30 minutes to 50 hours under inert or vacuum atmosphere to yield a silica-carbon composite. 10 g of the resulting silica-carbon composite is added to the 100 to 300 ml of 10 to 20 wt. % HF solution or 1 to 5N NaOH solution for 1 to 20 hours to remove silica followed by washing with distilled water several times. Finally, drying at 100 to 150 results in nanoporous carbons. These nanoporous carbons possess of surface areas of 800 to 1500 $m^2/g$, average pore diameter of 2 to 20 nm with narrow pore size distribution, and pore volume of 0.5 to 5 cc/g. For example, carbon using Ludox SM-30 stabilized by CTAB had narrow pore size around 8 nm.

So, the present invention relates to carbon materials having 2 to 20 nm pore size according to the above-mentioned procedure.

Also, this invention relates to electric double layer capacitor or supercapacitor using these carbon materials as electrode.

Electric double layer capacitor or supercapacitor comprises separator between electrodes, elecrolyte soaked in separator, and carbon electrode produced by said nanoporous carbons coated on current collector For example, a mixture of these nanoporous carbons and binder (10: 0.5 to 2 weight ratio) is dispersed in volatile solvent to form paste. This paste is coated on current collector, pressed and dried to make electrode laminate form.

Examples of the typical binders are polytertafluoroethylene (PTFE), polyvinylidenedifluoride (PVdF), cellulose and the like. Examples of the typical volatile solvents are such as isopropyl alcohol, N-methylpyrrolidone (NMP), acetone and the like.

Any metal can be used as current collector providing that possess high electrical conductivity and can paste carbon materials easily. For example, grid or foil of stainless steel, titanium or aluminum is of the sort.

After considering the characteristic of carbon materials, a reported or new appropriate method can be applied to coat carbon paste on current collector homogeneously. For example, after distributing carbon paste on current collector, the paste can be disperse homogeneously by doctor blade. In some case, it is possible to combine distribution and dispersion process. In addition, die-casting, comma-coating and screen-printing may be applied. It is also possible to coat on substrate film followed by pressing or laminating on current collector.

Drying of coated paste, for example, can be achieved by drying at 50 to 200 in the vacuum oven for 1 to 3 days.

In some cases, 5 to 20 wt. % of carbon black is added as conducting material to reduce the resistance of electrodes. Typical commercial conducting materials include carbon black, such as acetylene black (Chevron Chemical Company or Gulf Oil Company, etc.), Ketjenblack EC (Armak Company), Vulcan XC-72 (Cabot Company) and Super P (MMM company).

Carbon electrodes fabricated by the aforementioned procedures are used as both working electrode and counter electrode. Separator is inserted in between these two electrodes and electrolyte was soaked in them.

Electrolyte can be infiltrated into the fabricated electrodes either by immersing electrodes in the electrolyte solution for 1 to 3 days or by repeating 5 to 20 cycles of dropwise addition of electrolyte solution (1 to 10 ml per 1 $cm^2$ electrode area) followed by lying under vacuum. The carbon electrodes produced by the present invention take shorter infiltration time compared to that of commercial activated carbon.

Separator serves as a material that protects electric short between two carbon electrodes and immerses electrolyte solution. Typical separator materials are polymers, glass-fiber matrix and graft paper. Commercial separators include Celgard series such as 2400, 2300 (Hoechest Celanese Corp.) and polypropylene membrane (Ube Industries Ltd. or Pall RAI company).

As another component of electric double layer capacitors is electrolyte which can be either organic or aqueous. In typical organic electrolyte, 0.5 to 3 mol/L solution of salt which composed of cations such as tetraalkylammonium (e.g., tetraethylammonium and tetramethylammonium), lithium ion and potassium ion, and anions such as tetrafluoroborate, perchlorate, hexafluorophosphate, bis-trifluoromethanesulfonyl imide or tris-fluoromethanesulfonyl methide is dissolved in nonprotonic solvent with especially high dielectric constant (e.g., propylene carbonate and ethylene carbonate) and/or low viscosity (diethyl carbonate, dimethyl carbonate, ethylmethyl carbonate, dimethyl ether and diethyl ether). 5 to 100 wt. % of $H_2SO_4$ solution or 0.5 to 20 M of KOH solution is typically applied as aqueous electrolyte. Capacitance of electric double layer capacitors depends on the kind of electrolytes.

Electric double layer capacitors fabricated by the present invention possess capacitance of 50 to 180 F/g. The regularly connected mesopores of carbon materials applied as electrodes facilitate easy ion transport of electrolytes and lower resistance (for the electrodes with thickness of 20 to 1000, they exhibit ESR of 0.05 to 2 ). Even at high charge-discharge current density ($A^{-2}$), they exhibit high charge storage capacity ($mAhg^{-1}$).

EXAMPLES

The detailed explanations are presented in the following examples, which are just for the illustration of these inventions, do not restric the scope of this invention.

Example 1

In order to obtain silica sol stabilized by surfactant, 5 g of CTAB (cetyltrimethylammonium bromide) was added to 100 ml of Ludox HS-40 silica sol aqueous solution and the mixture was stirred for 20 min at 50, resulting in a muddy slurry. The stabilized silica particles were collected by filtration under vacuum and were washed with double-distilled water to remove un-adsorbed surfactant. Resorcinol-formaldehyde gel (RF gel) was used as a carbon precursor. A solution of resorcinol : formaldehyde : $Na_2Co_3$ (catalyst) : $H_2O$ (1:2:0.015: 5.6 molar ratio) with pH 7.3 was added dropwise under mild suction to be infiltrated into the CTAB-stabilized silica particles. The resulting yellow RF-silica composite was aged at 85 for three days to obtain a red RF gel-silica composite. The composite was carbonized at 850 for 3 hours under nitrogen to yield a silica-carbon composite. To remove the silica template, the carbon-silica composite was stirred in 48 wt. % aqueous HF solution for 12 h.

Figure 1:
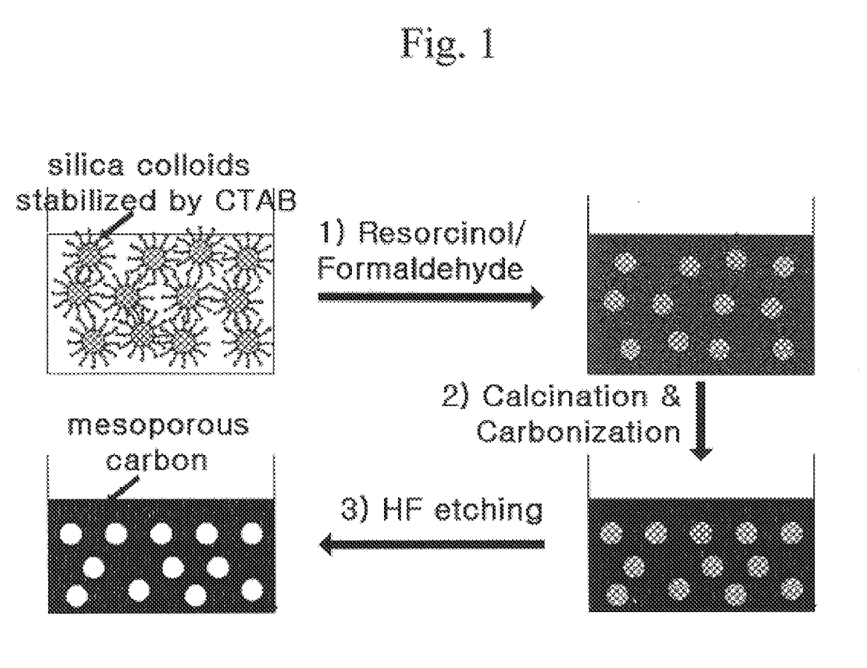
FIG. 1 is a schematic illustration for the synthesis of the carbon materials presented in the example 1.
Figure 2:
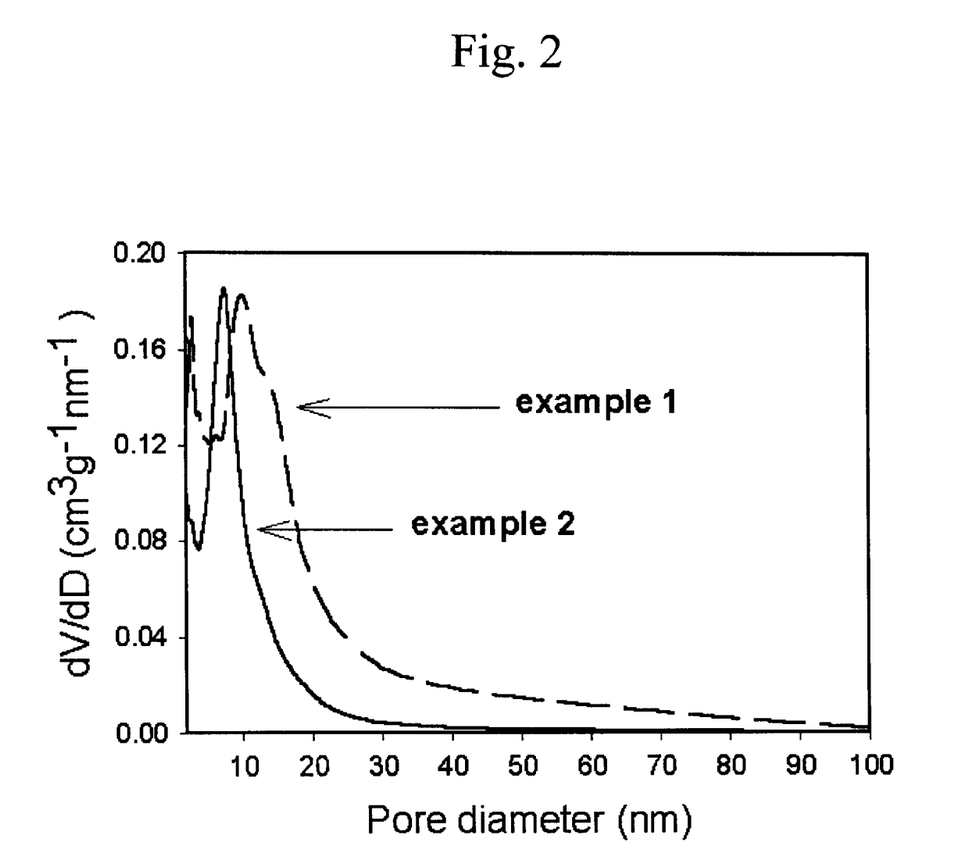
FIG. 2 is plots for the pore size distributions of carbon materials presented in the example 1 (Ludox HS-40 was used as template) and example 2 (Ludox SM-30 was used as template), measured by the nitrogen adsorption method.
Figure 3:
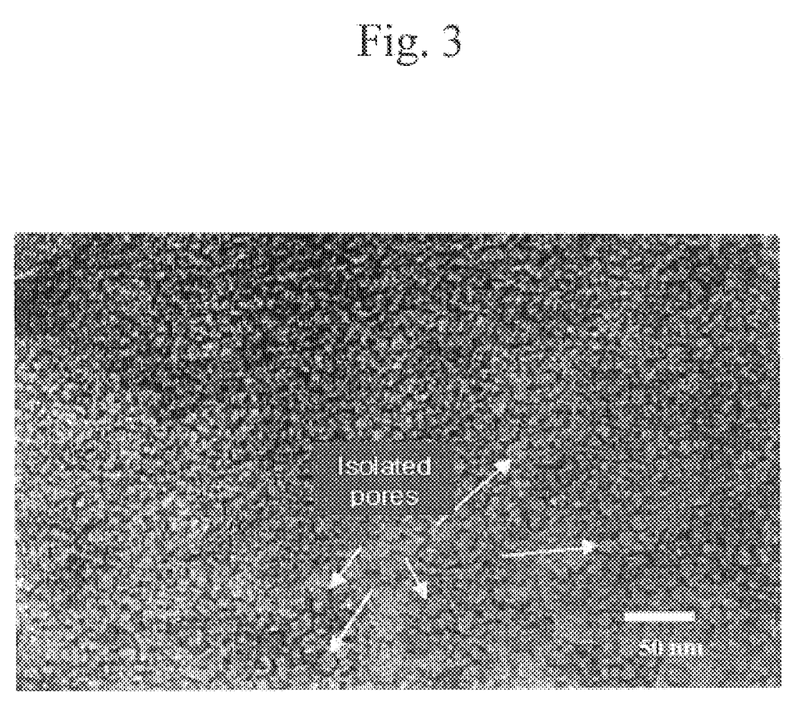
FIG. 3 is a scanning electron micrograph of the carbon material presented in the example 1.

The obtained carbon has surface area of 1510 $m^2/g$, pore volume of 3.6 cc/g, and the fraction of mesopore and macropore (greater than 2 nm) of over 99%. The schematic for the synthetic procedure is illustrated in the FIG. 1. The pore size distribution of the synthesized nanoporous carbon (FIG. 2) showed narrow pore size distribution with peak at 12 nm. FIG. 3 exhibited the transmission electron micrograph (TEM) of the carbon material obtained at the magnification of 250,000.

Example 2

Preparing Carbon Material-1

Except using Ludox SM-30 instead of Ludox HS-40 as inorganic template, the overall synthetic method was identical to that in example 1. The obtained carbon had surface area of 1090 $m^2/g$, pore volume of 1.7 cc/g, and the fraction of mesopore and macropore (greater than 1.7 nm) of over 83%. FIG. 2 showed that the carbon exhibited a narrow pore size distribution with peak at 8 nm.

Example 3

Preparing Carbon Material-2

Figure 4:
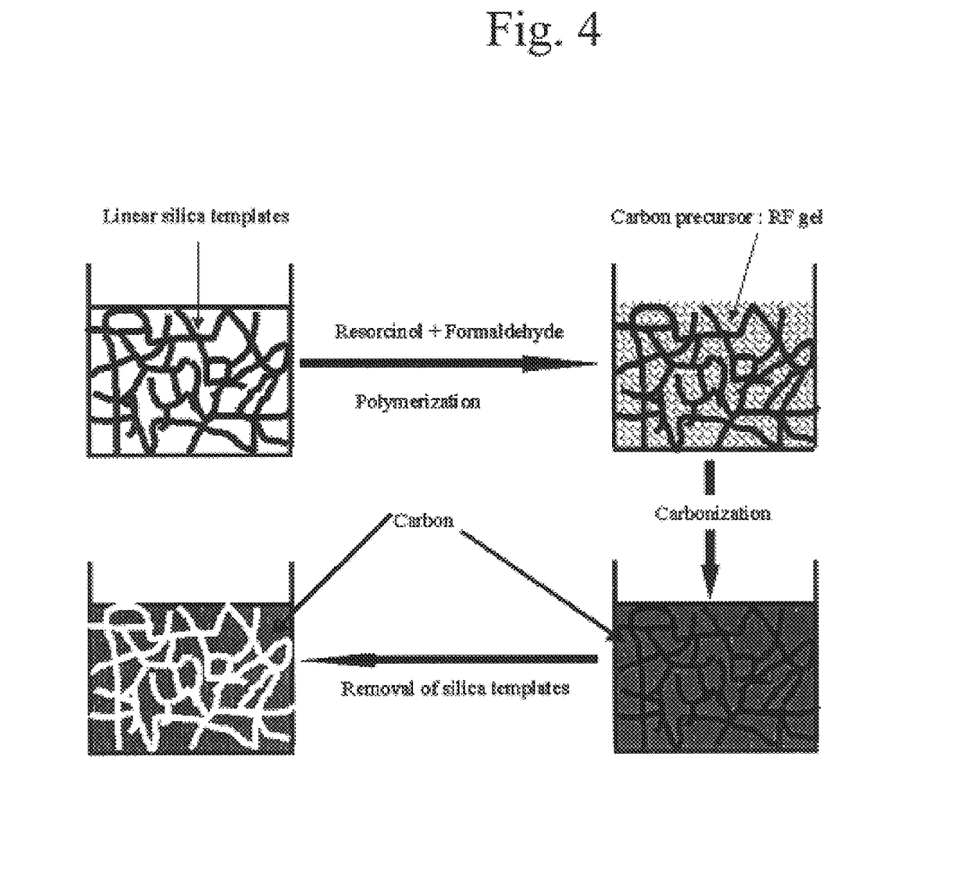
FIG. 4 is a schematic illustration for the synthesis of the carbon materials (Snowtex-up was used as template) presented in the example 3.
Figure 5:
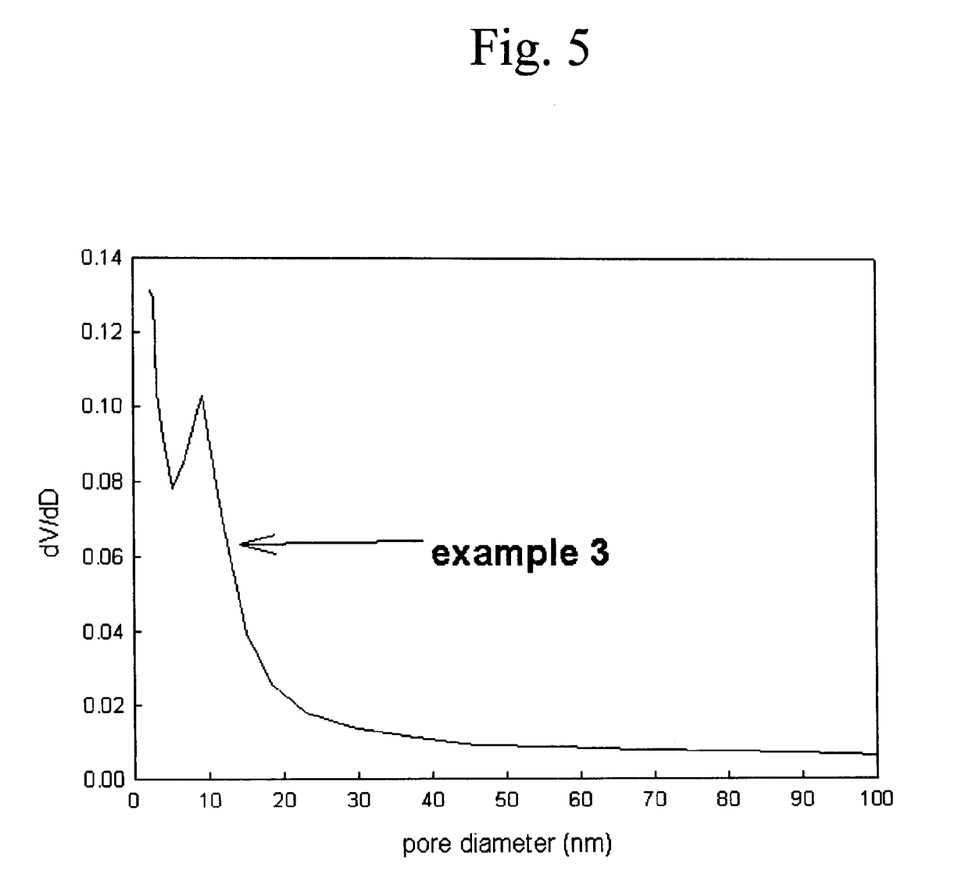
FIG. 5 is a plot for the pore size distribution of the carbon material presented in the example 3, measured by the nitrogen adsorption method.
Figure 6:
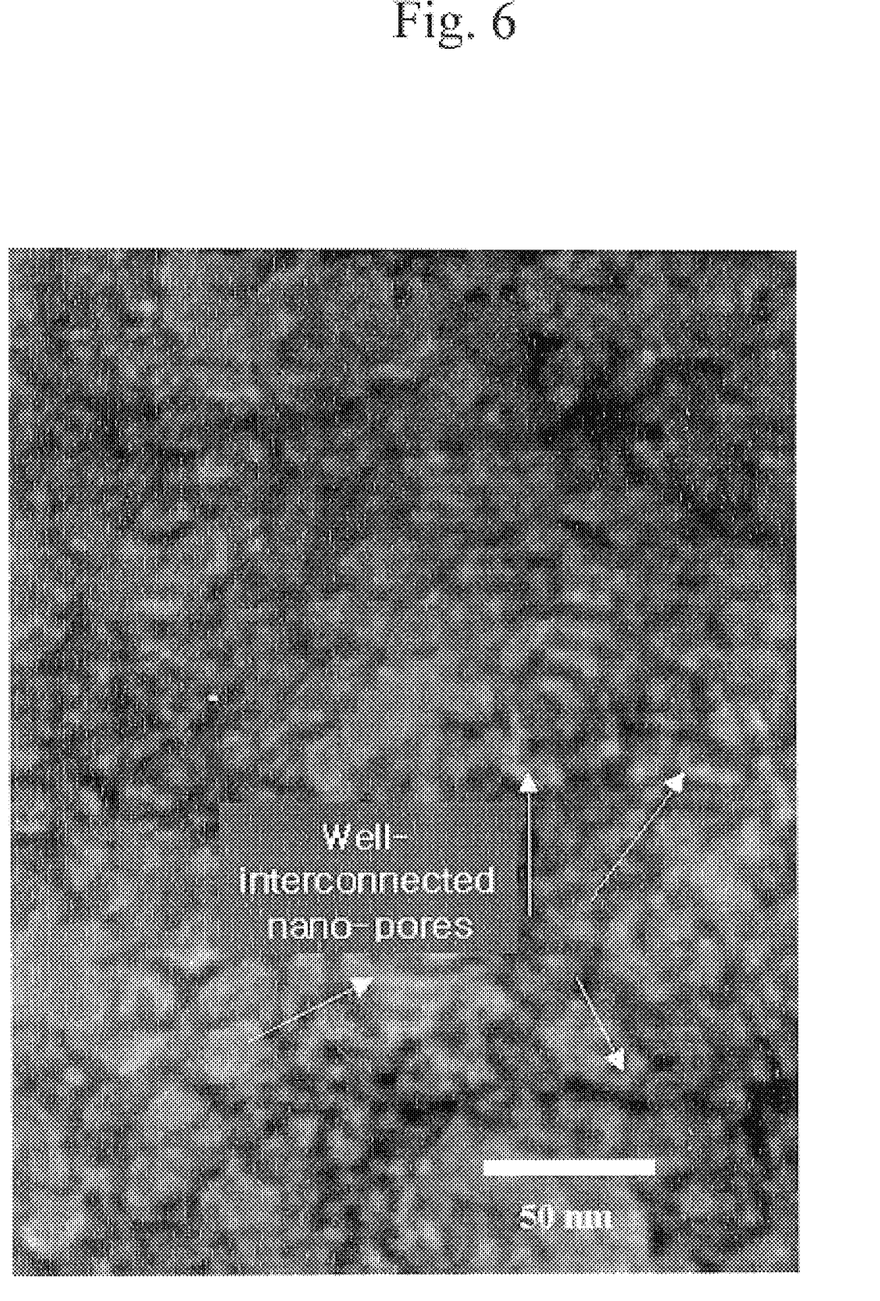
FIG. 6 is a transmission electron micrograph of the carbon material presented in the example 3.

Except using SNOWTEX-UP (extented silica sol aqueous solution) instead of Ludox HS-40 as inorganic template, the overall synthetic method was identical to that in example 1. The obtained carbon had surface area of 1087 $m^2/g$, pore volume of 2.1 cc/g, and the fraction of mesopore and macropore (greater than 1.7 nm) of over 86%. The schematic for the synthetic procedure for the carbon in the example 3 is illustrated in the FIG. 4. The pore size distribution of the synthesized nanoporous carbon (FIG. 5) showed narrow pore size distribution with peak at 8 nm. FIG. 6 exhibited the transmission electron micrograph (TEM) of the carbon material obtained at the example 3 at the magnification of 430,000.

Example 4

Electrical Conductivity of Carbon Materials

The electrical conductivity of each carbon produced by example 2 and example 3 was measured according to four-probe van der Pauw method (Carbon, 24, 337 (1986)) under 1000 psi pressure, and the conductivity of example 2 and example 3 were 10 S/cm and 8.5 S/cm, respectively.

Example 5

Using carbon material-1 and -2 produced by example 2 and 3, repectively, as electrode, EDLC test was performed in the electrolyte that 1 M of tetraethylammonium tetrafluoroborate ($Et_4NBF_4$) was dissolved in propylene carbonate solvent.

Figure 7:
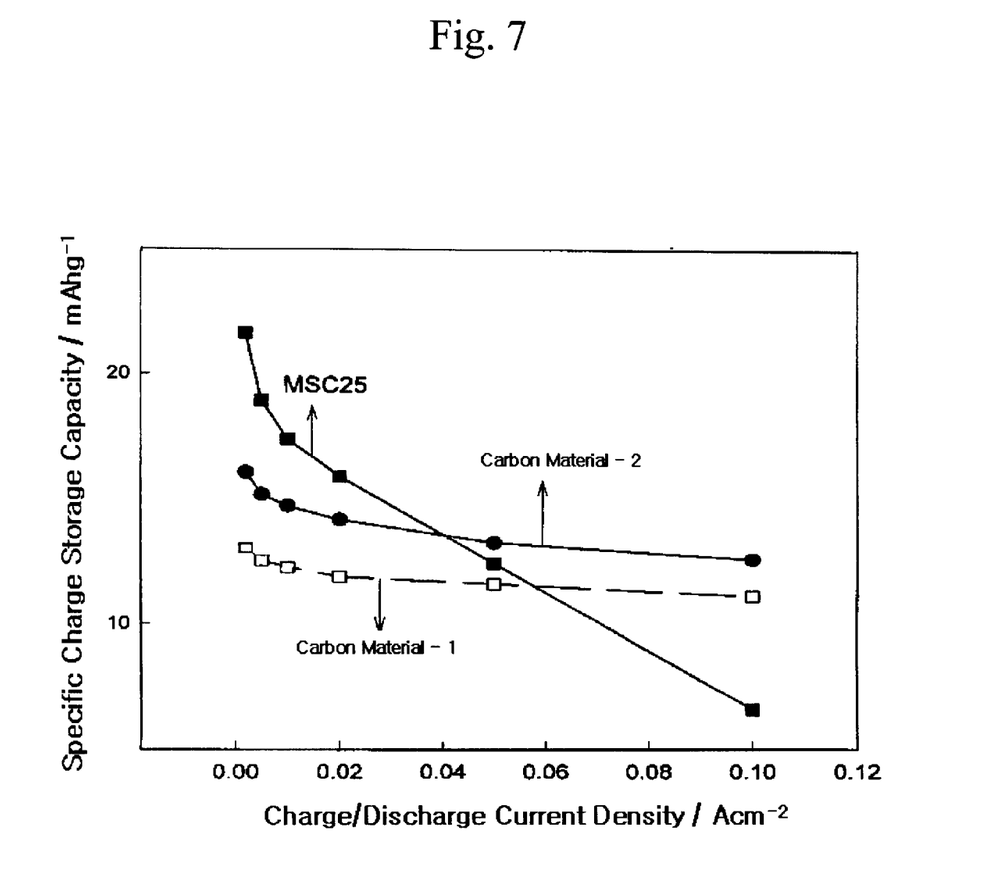
FIG. 7, FIG. 8, and FIG. 9 are plots of the dependence of charge storage capacities on electrolyte concentration and current density for the electric double layer capacitors using the carbon materials presented in the example 2 and example 3.

Firstly, to fabricate the electrode, the mixture of carbon material-1 or -2 and PTFE binder (the mixing ratio was 10:1, respectively) was dispersed in isopropyl alcohol. With doctor blade, this paste was coated on the 1 $cm^2$ of stainless grid and dried at 120 for 24 hours in the vacuum oven. Locating polymer separator (commercial name: Celgard) between two electrodes, it was compressed with clip and immersed in the electrolyte. Constant current charge-discharge experiments were performed in the voltage range of 0 to 3 V and current density of 0.01 to 0.1 $A/cm^2$. Charge capacity per weight was calculated from dividing stored charge with carbon weight. FIG. 7 illustrated the change of charge capacity per weight according to the charge-discharge current density, and Table 1 shows charge capacity per weight ($Fg^{-1}$).

For the comparison, reference EDLC was fabricated by using MSC 25 (molecular sieving carbon produced by Kansai Coke and Chemicals company, average pore diameter<2 nm), which is already used for EDLC.

Example 6

Figure 8:
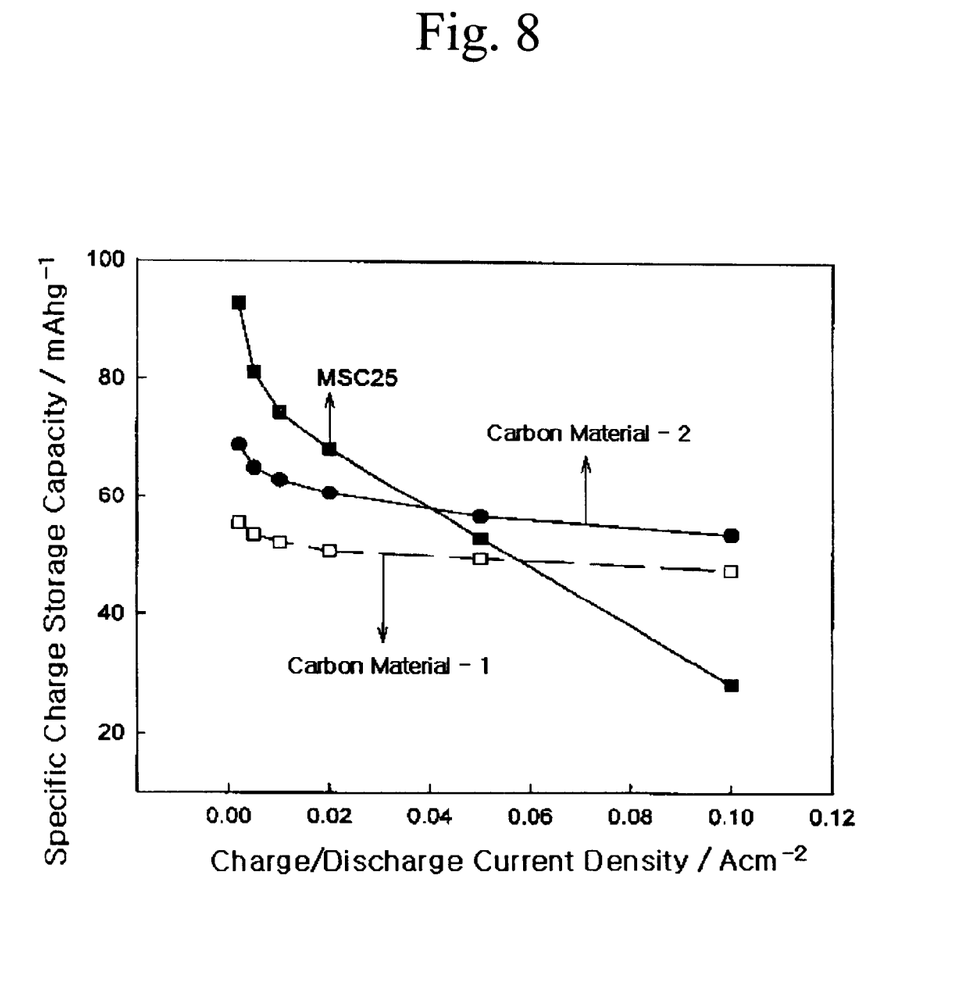

Except that 30 wt. % $H_2SO_4$ solution was used as electrolyte instead of organic electrolyte and the voltage range of 0.0 to 0.8 V was used, the overall synthetic method was identical to that of example 5. FIG. 8 illustrates the dependence of charge capacity per weight on charge-discharge current density. Table 1 shows charge capacity per weight ($Fg^{-1}$).

For the comparison, reference EDLC was fabricated by using MSC 25, which is already used for EDLC.

Example 7

Figure 9:
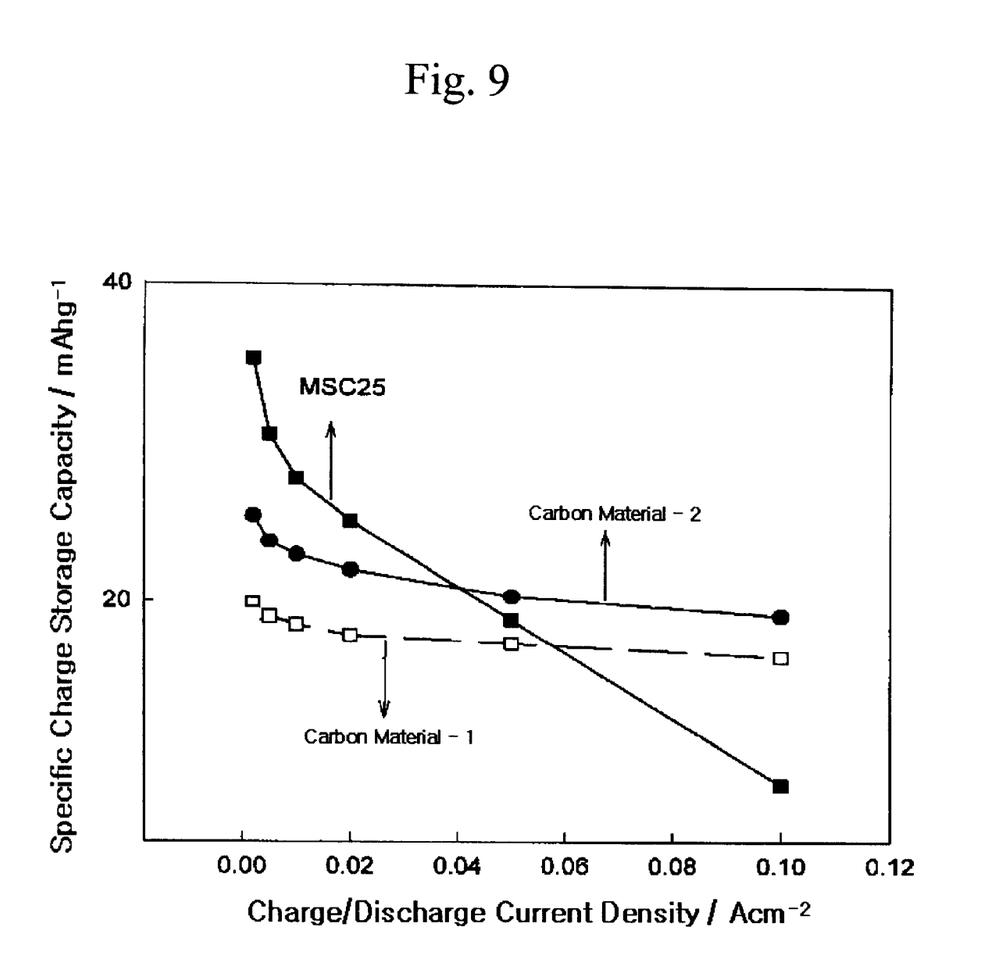

Except that 3 M KOH solution instead of organic electrolyte was applied as electrolyte and the voltage range of 0.0 to 0.8 V was used, the overall synthetic method was identical to that of example 5. FIG. 9 illustrated the dependence of charge capacity per weight on charge-discharge current density. Table 1 shows charge capacity per weight ($Fg^{-1}$).

For the comparison, reference EDLC was fabricated by using MSC 25, which is already used for EDLC.

TABLE 1

| | | | Charge capacity per weight ($Fg^{-1}$) | | |
|---|---|---|---|---|---|
| | surface area ($m^2g^{-1}$) | Electronic conductivity ($Scm^{-1}$) | Example 5 (1M $Et_4NBF_4$ in propylene carbonate) | Example 6 (30% $H_2SO_4$ aqueous solution) | Example 7 (3 M KOH aqueous solution) |
| MSC25 | 1970 | 1.1 | 133 | 230 | 97 |
| Carbon materials-1 (Example 2) | 1090 | 10 | 85 | 145 | 60 |
| Carbon materials-2 (Example 3) | 1087 | 8.5 | 102 | 175 | 73 |

*Electronic conductivity: By means of van der Pauw method (reference: [Carbon, 24, 337(1986)]), measurement under 1000 psi pressure As known in Table 1, the carbon material-1 and -2 exhibited lower surface area compared to that of commercial MSC 25 carbon material. The carbon material-1 and 2 can be utilized as electrodes for electric double layer capacitors without adding conducting additive because they possess high electrical conductivity; greater than 7 S/cm.

Even though EDLC produced by present invention had lower capacitance than MSC25, carbon material-1 and -2 did not show a great decrease in charge capacity, comparing to that the charge capacity of MSC25 suddenly decreased with increasing current density. So, in the condition of high charge-discharge rate, EDLC produced by present invention had superior charge capacity per weight compared to that of MSC25. Especially, the carbon materials produced by example 3 had superior charge capacity per weight compared to those carbons presented in the example 1 and 2, which means that the extended silica sol template applied in the example 3 resulted in the production carbon material with better pore connectivity.

The Effect of the Invention

According to the method of the present invention, nanoporous carbon materials with controllable pore sizes and shapes can be easily produced. In addition, the carbon materials produced using linear or extended forms of inorganic templates exhibited high electrical conductivity and possess well-interconnected pores with size ranging 2 nm to 20 nm. These nanoporous carbons exhibited relatively small capacitance per weight because they possess low surface area compared to that of conventionally used carbon materials.

However, they exhibited much higher charge storage density at high charging/discharging current density than that of the electric double layer capacitor whose electrodes are made of conventional carbon materials, because the nanorporous carbons of present invention have low equivalent series resistance compared to that of conventional carbon material.

What is claimed is:

1. A method for preparing a carbon material comprising:
   (a) providing an inorganic-template/carbon-precursor composite comprising inorganic template particles stabilized with a surfactant and a carbon precursor that can be carbonized with heat treatment, said inorganic template particles being non-mesoporous and being well dispersed in the carbon precursor;
   (b) treating the inorganic-template/carbon-precursor composite under conditions effective to carbonize the carbon precursor with formation of an inorganic-template/carbon composite, said treating comprising subjecting the inorganic-template/carbon-precursor composite to a temperature of 600C. to 1500C. in an inert atmosphere; and
   (c) treating the inorganic-template/carbon composite formed in step (b) with an acid or base to remove the inorganic template particles followed by drying of the treated inorganic-template/carbon composite to form a mesoporous carbon material having pore sizes ranging from 2 nm to 20 nm.

2. The method according to claim 1, wherein the inorganic-template/carbon-precursor composite is subjected to the temperature in step (b) for a period of 30 minutes to 50 hours.

3. The method according to claim 2, wherein the inorganic template particles are selected from the group consisting of slica, alumina, titania and ceria.

4. The method according to claim 3, wherein the surfactant is selected from the group consisting of a cationic surfactant, a neutral surfactant, and an anionic surfactant.

5. The method according to claim 4, wherein the surfactant is an alkyltrimethylammonium halide.

6. The method according to claim 4, wherein the surfactant comprises oleic acid or an alkyl amine.

7. The method according to claim 4, wherein the surfactant comprises sodium alkyl sulfate or sodium alkyl phosphate.

8. The method according to claim 4, wherein the carbon precursor is selected from the group consisting of resorcinol-formaldehyde gel, phenol-formaldehyde gel, phenol resin, melamine-formaldehyde gel, furfuryl alcohol, polyacrylonitrile and petroleum pitch.

9. The method according to claim 8, wherein said non-mesoporous inorganic template particles comprise silica that is spherical, linear or extended in shape.

10. The method according to claim 9, wherein the silica is linear or extended in shape.

11. The method according to claim 8, wherein step (a) comprises preparing an aqueous sol solution containing 20 to 60 weight percent of the non-mesoporous inorganic template particles stabilized with the surfactant, and mixing the aqueous sol solution with 30 to 70 weight percent of an aqueous solution comprising a mixture of resorcinol and formaldehyde in a molar ratio of 1:2 to 1:3 to form a resultant mixture of resorcinol-formaldehyde and inorganic template particles in a weight ratio of 1:1 to 1:20, and then polymerizing the resultant mixture at 20C. to 95C. to form the inorganic template/carbon-precursor composite.

12. The method according to claim 8, wherein step (a) comprises preparing an aqueous sol solution comprising 20 to 60 weight percent of the non-mesoporous inorganic template particles stabilized with the surfactant, and mixing the aqueous sol solution with an organic solution comprising 10 to 100 weight percent of the carbon precursor to produce the inorganic template/carbon-precursor composite with the carbon precursor being present with respect to the inorganic template particles in a weight ratio of 1:1 to 1:20, the carbon precursor comprising phenol resin, melamine-formaldehyde gel, polyfurfuryl alcohol, polyacrylonitrile and/or petroleum pitch.

* * * * *